United States Patent [19]
Owens

[11] Patent Number: 5,624,128
[45] Date of Patent: Apr. 29, 1997

[54] TRANSPORT SYSTEM FOR DISABLED PEOPLE

[76] Inventor: Jesse L. Owens, P.O. Box 1417, Palmer, Ak. 99645

[21] Appl. No.: 399,363

[22] Filed: Mar. 6, 1995

[51] Int. Cl.$^6$ ........................................ B62M 1/14
[52] U.S. Cl. ..................... 280/250.1; 280/1.5; 280/5.2; 280/47.38; 280/62; 280/DIG. 10
[58] Field of Search ............... 5/81.1, 86.1; 297/DIG. 4; 280/1.5, 5.2, 5.24, 5.28, 5.3, 200, 250.1, 292, 304.1, 43.17, 47.38, 62, 763.1, 767, DIG. 10, 47.11; 296/19, 20; 180/21, 22, 209; 104/112, 183

[56] References Cited

U.S. PATENT DOCUMENTS

| | | | |
|---|---|---|---|
| 1,110,499 | 9/1914 | Laborda | 104/112 |
| 2,649,309 | 6/1953 | Deissner | 280/767 X |
| 3,968,530 | 7/1976 | Dyson | 5/338 |
| 4,098,521 | 7/1978 | Ferguson et al. | 280/250.1 |
| 4,247,125 | 1/1981 | Rayment | 280/250.1 |
| 4,360,213 | 11/1982 | Rudwick et al. | 280/250.1 |
| 4,542,918 | 9/1985 | Singleton | 280/250.1 |
| 4,565,385 | 1/1986 | Morford | 280/304.1 |
| 4,892,323 | 1/1990 | Oxford | 280/250.1 |
| 4,986,563 | 1/1991 | Grant | 280/47.11 X |
| 5,076,599 | 12/1991 | Lockett et al. | 280/62 X |
| 5,090,714 | 2/1992 | Seekins et al. | 280/1.5 X |
| 5,106,108 | 4/1992 | Howell | 280/1.5 |

FOREIGN PATENT DOCUMENTS 60-43678  3/1985  Japan .

OTHER PUBLICATIONS

Ruth Berkowitz, "Conquering the Mountain", S'NS, pp. 42–44, Sep. 1993.
Advertisement for Phoenix Off–Road Wheelchair, Wildernet, Inc., Denver, Colorado, 2 pp., Nov. 1994.
Roleez Sport Wheeler and Fun Wheeler, J.A. Preston Corporation, 1 p., 1990.
Ron Dalby, "Jesse Owens Conquers Peak in a Wheelchair", Frontiersman, vol. 46, No. 97, p. 1 (1994).

*Primary Examiner*—Brian L. Johnson
*Assistant Examiner*—Victor E. Johnson
*Attorney, Agent, or Firm*—James Creighton Wray

[57] ABSTRACT

A transport apparatus for disabled individuals has a frame for carrying a driver, drive wheels, at least one front wheel, a back support and a push structure. The drive wheels are removable connected to drive wheel mounts. Those mounts are positioned on the frame near the rear of the frame. The front wheel is connected to a rotating fork that is mounted to the front of the frame by a fork mount. The push structure extends upward from the rear of the frame and is positioned behind the back support. For overcoming obstacles, pre-wheels are connected to the frame on mounts positioned ahead of the drive wheel mounts. For travel on narrow trails, the pre-wheels are removed from the side mounts and connected to an auxiliary mount attached to the rear of the frame. Once on the auxiliary mount, the drive wheels are removed and the pre-wheels serve as the rear support for the apparatus. A steering bar is coupled to the front of the frame for towing applications and for steering purposes. Harnesses are connectable to the apparatus for off-road wilderness expeditions. The width of the apparatus is reduced by activating wheeled extensions connected to the rear of the apparatus. The extensions have rotating arms hinged to the rear of the frame. When narrow doorways are encountered, the extensions are rotated to active positions and the drive wheels are lifted from the ground. The wheels of the extensions serve as the rear wheel support of the apparatus, and the drive wheels are removed, thereby reducing the width of the apparatus.

21 Claims, 13 Drawing Sheets

TRANSPORT SYSTEM FOR DISABLED PEOPLE

BACKGROUND OF THE INVENTION

The only means of accessing off-road locations currently available to mobility impaired individuals are motorized vehicles. That substantially limits the locations that disabled people can legally access and greatly diminishes the wilderness experience. Those problems stem largely from the limitations that conventional wheelchairs impose on their users.

Wheelchair users and others who must use walking aids are confined to smooth hard surfaces. Commercially available wheelchairs are much too fragile to withstand the rigors of cross-country travel.

Attempting to travel over uneven terrain in a wheelchair is a dangerous and frustrating endeavor that often results in serious injury. Wheelchairs are very difficult for able-bodied companions to maneuver. Attempts to assist in off-road wheelchair expeditions frequently result in back injuries to assistants.

Limitations of conventional wheelchairs render almost all natural settings completely inaccessible to the disabled. Those limitations create an unfortunate deficit in the lives of disabled people.

The manually-powered off-road transport system for the disabled described below is specifically designed to remedy problems wheelchair users encounter.

Another significant impediment confronted by disabled people is narrow doorways. That problem is extremely common in older hotels and motels. Bathroom doorways are not wide enough for a wheelchair to pass. In foreign countries, that problem is commonplace.

Despite recent federal legislation mandating the removal of architectural barriers to wheelchair users, problems remain. In many parts of the United States, particularly in rural or older regions, there is lax compliance with the federal laws regarding widening of doorways.

To remedy that problem, the present invention describes an unobtrusive accessory for a transport apparatus for disabled individuals that readily permits passage of the apparatus through narrow doorways.

SUMMARY OF THE INVENTION

The present invention relates to transportation systems and wheelchair accessories for the disabled.

The present invention withstands rugged treatment and is stable due to a low center of gravity and long wheelbase. The apparatus is powered independently in the same manner as an ordinary wheelchair, but unlike a conventional chair, the present invention incorporates mechanisms that provide for the assistance of one or more able-bodied companions.

The present invention is designed to be used in rugged environments, including hiking trails, beaches, rural areas, and bush villages in regions like Alaska. The transport apparatus permits disabled people to participate in hiking, camping and other outdoor activities that are currently impossible in the absence of an off-road transport system.

The transport system is a multiple wheeled apparatus having a frame and a push structure. The driver sits upright with his legs extended straight forward. The frame is constructed of Chrome-molybdenum (Chrome-moly) steel alloy.

The frame has seating made of thick nylon fabric mounted on the frame by aluminum strap. Pads are connected on the lower frame to provide support for the ankles of the driver. The driver is secured in the apparatus by safety belts with quick release buckles at the chest, waist, and ankles.

The dimensions of the device depend on the specific needs of the driver. The standard design has a frame that is four feet long and one-and-one-half feet wide. The rear of the device clears the ground by 10 inches and the front of the device clears the ground by 22 inches. The weight of the device is 40 pounds.

On the front end of the frame is a front wheel which may be a 16 inch wheel. The front wheel is connected to a rotating fork. The rotating fork is connected to a front frame mount that is coupled to the front of the frame. A steering bar is attached to the lower part of the front fork by a universal joint. When in use the steering bar slants upward and is held about waist level by the able-bodied assistant.

The steering bar performs three functions. First, the bar allows the rider to concentrate on providing power to the device because the tow bar provides the steering when attached. Second, the bar provides an efficient method of delivering pulling power to the device. Third, the bar acts as a skid that pops the front wheel over abrupt obstacles, thereby protecting the front wheel and fork assembly from damage.

Drive wheels are mounted on the lower end sides of the frame. The drive wheels are 20×2.215 inch high-impact plastic rims with deep-tread mountain bike tires mounted on the rims. The drive wheels are mounted with 9 to 12 degrees of camber to prevent forearms rubbing on the tire while pushing on the handrims. Flat-proof tubeless inserts replace innertubes to prevent flats during cross-country travel.

The present invention is self-propelled by the driver. The driver pushes on handrims mounted on the drive wheels, or on the drive wheels directly, as with a regular wheelchair.

A back support is supported by a T-shaped bar that extends from the rear of the frame. The back support is padded for providing support to the back of the driver.

The push structure has elevated rear handles that able-bodied assistants use to push and laterally stabilize the apparatus. The push structure has vertical members and a horizontal bar extending across the members. Additional sloped members extending from the rear of the frame and supporting the back rest can be incorporated. The space between the back rest and the vertical members of the push structure is used as a compartment 18 to store a backpack or other camping supplies.

Lift handles are mounted on the vertical members. The elevation of the lift handles are adjustable and the handles provide an efficient mechanism for lifting the apparatus over major obstacles. The handles and push structure serve as attachment points for carabineers and tow lines.

Pre-wheels are mounted about 4 inches off the ground on pre-wheel mounts connected to the sides of the lower frame. The pre-wheel mounts are connected to the frame ahead of the drive wheel mounts. The pre-wheels are smaller than the drive wheels. When encountering an obstacle, the pre-wheels roll on the obstacle first, which lessens the vertical distance that the apparatus has to be directly lifted to overcome the obstacle. The pre-wheels, in effect, allow the device to ramp up over obstacles and greatly facilitate travel over trails containing large rocks, roots, logs and other obstacles in the pathway.

Both the drive wheels and the pre-wheels are mounted with commercially available quick-release axles (not shown). Those axles permit the rapid removal and reinstallation of the wheels.

A frequent problem encountered when attempting to access trails is that many trails are narrow and difficult to pass. To deal with that problem, an auxiliary mount for the pre-wheels is positioned on the center-rear of the device. The pre-wheels are removed from the pre-wheel mounts on the sides of the frame and positioned on the auxiliary mount. The drive wheels are removed via their quick release axles, and the pre-wheels function as the rear support wheels of the apparatus. That decreases the overall width of the device by about 8 inches and, in general, permits passage through even very narrow trails. With the drive wheels removed, an able-bodied assistant provides propulsion and lateral stability.

Brakes from a wheelchair are mounted on at the rear of the drive wheels.

Additional pulling power is added to the system by hooking additional people up in linear series to the device. Each additional puller is connected by attaching a linear series of towing harnesses to the front of the transport vehicle. Each harness has wide (4 inches) nylon webbing towing straps that rest against the anterior pelvic region of the puller and are held in place vertically by a smaller attached strap that fastens around the waist of the puller. The first towing harness is attached directly to the frame, and each additional towing harness is attached via mountain climbing ropes and carabineers to the preceding harness. That feature permits the rapid serial addition or removal of pullers as needed. When going down steep inclines some of the pullers are attached via the towing harnesses to the rear of the device to provide additional braking power.

For passage through narrow doorways and trails, the present invention is further equipped with rear extensions. The extensions have rotating arms with small rear wheels mounted on the distal ends of the arms. The proximal ends of the arms are attached by a hinge to the rear of the frame.

In the lifted, inactive positions, the arms point forward and rest up against the bottom frame. The arms are held in the retracted position by elastic cords that extend between the extensions and the frame. To decrease the width of the chair and to pass through an otherwise impassable doorway the following steps are taken:

1) The removable arm rest or a lever is lifted out of its socket and the rotating arm falls to the ground.

2) The end of the arm rest or lever is inserted into receivers positioned on the rotating arms.

3) The arm rest or lever is used to rotate the rotating arm rearward until the arm comes to a stop. At that point the arm is pointing a few degrees rearward and is in the active position.

4) The arm rest or lever is reinstalled into the normal socket. The length of the arm has been adjusted so that when it is in the active position, the wheelchair wheel is raised off the ground about ½ inch.

5) The same procedure is completed on the other side of the apparatus.

6) The drive wheels are removed and the rear wheels of the extensions serve as the rear support for the apparatus.

The user now pulls himself through the doorway using the wheels on the bottom of the rotating arm. Once through the doorway, the drive wheels are reinstalled and the extensions are returned to the inactive, lifted positions using the arm rest or lever.

One of the many advantages of the present invention is that when not in use, the extensions are completely out of the way and do not interfere with the function or the folding of the transport apparatus. The installation of the extensions requires no welding or other alteration of the standard wheelchair frame. An additional benefit is that the extensions add little weight to the apparatus.

It is desirable for the driver of the present invention to provide as much power to the apparatus as possible, especially during ascents of steep terrain. Similarly, the driver needs to be able to provide braking control to the apparatus while descending steep slopes. A specialized self-tailing hand winch accessory is connectable to the present invention for providing power in both directions. The accessory moves along a fixed mountain climbing rope and provides pulling power to ascend slopes and braking power when descending slopes. The hand winch is mounted on a frame member that is positioned above the head of the driver and runs parallel to the long axis of the chair. The accessory is designed to be readily added or removed from the present invention. Positioned between the driver and the winch is a padded face guard.

The accessory is powered by two pedals positioned at 180 degrees to each other. The pedals turn a shaft. Two sheaves are mounted on the shaft. The interior face of the sheaves angle away from each other like a conventional V-pulley, with an internal angle of about 20 degrees. Crescent-shaped ridges are positioned on the interior face of each sheave. The ridges, which grip the climbing rope, point both forwards and backwards, alternating direction periodically. That provides for gripping power in both directions. The ridges extend about ⅛ inch above the surface. To grip the rope in either direction, the rope is fed into the winch and wrapped about ¾ turn through the sheaves. As an increasing tension is applied, the rope sinks progressively deeper into the groove and the ridges progressively grip the rope tighter and tighter The accessory can supply sufficient pulling force to pull the present invention and the driver up the steepest slopes without slipping.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
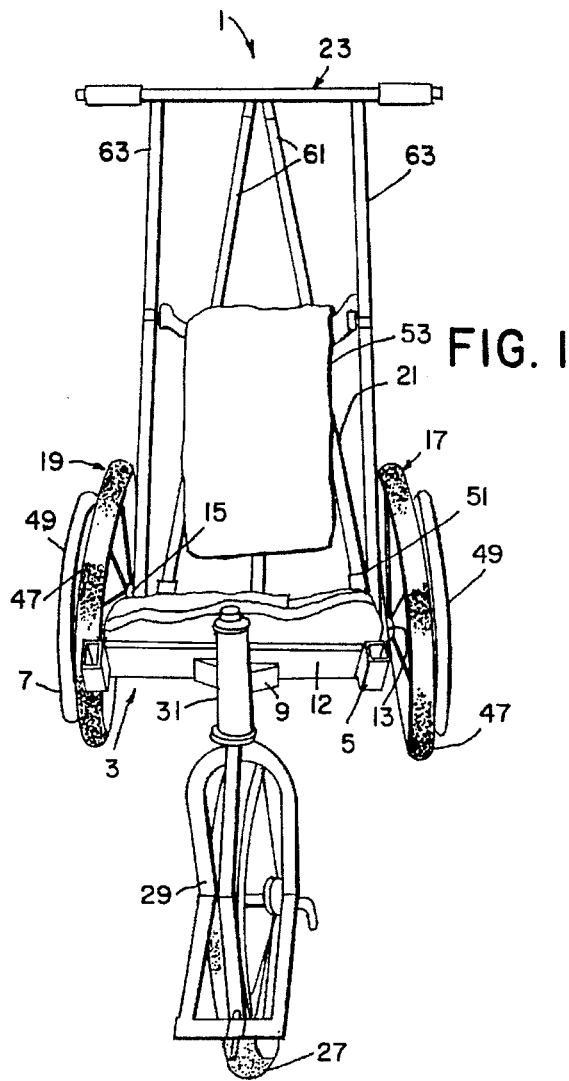
FIG. 1 is a front view of an embodiment of the present invention.
Figure 2:
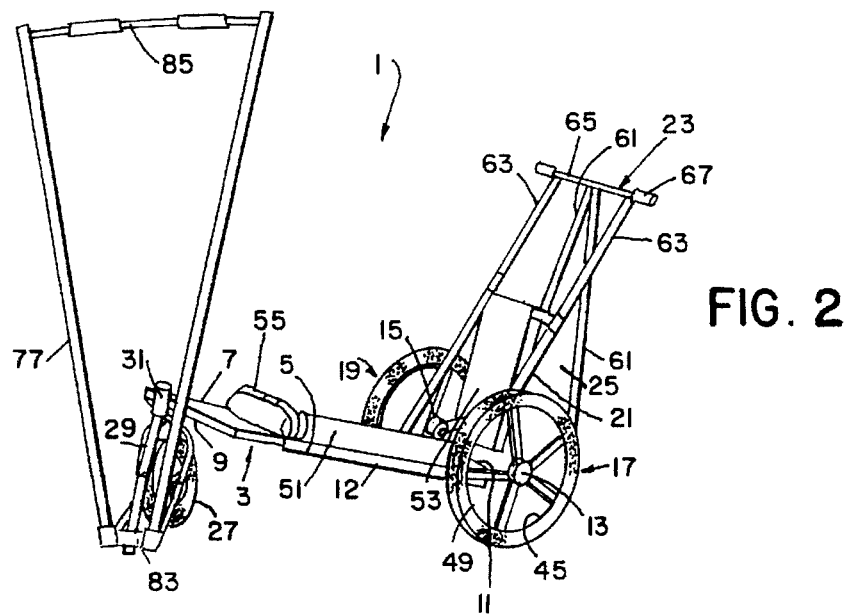
FIG. 2 is a side view of the embodiment of the present invention shown in FIG. 1.

Referring to the drawings and initially to FIG. 1, the present invention is a transport apparatus 1 for disabled individuals having accessories for facilitating travel. The present invention has a frame 3 for carrying the driver and at least three wheels mounted on the frame 3. FIGS. 1 and 2 show one embodiment of the present invention. The apparatus 1 includes a frame 3 having a first side member 5, a second side member 7, a front 9 and a rear 11. A platform 12 is connected to the frame 3. A first drive wheel mount 13 is connected to the first side member 5 of the frame 3 near the rear 11 of the frame 3. A second drive wheel mount 15 is connected to the second side member 7 of the frame 3 near the rear 11. First and second drive wheels 17, 19 are connected to the first and second drive wheel mounts 13, 15. In preferred embodiments, the drive wheels 17, 19 are removably connected to the drive wheel mounts 13, 15. A back support 21 extends upward from the rear of the frame. A push structure 23 extends upward from the rear 11 of the frame 3 behind the back support 21. As shown in FIG. 2, a space 25 exists between the back support 21 and the push structure 23. Space 25 serves as a compartment for storing a backpack or other camping supplies.

As shown in FIGS. 1 and 2, preferred embodiments have the drive wheels 17, 19 mounted at a predetermined degree of camber to prevent forearms of users from rubbing on the wheels 17, 19 while drivers push the apparatus forward. In one embodiment, the drive wheels 17, 19 are mounted with 9 degrees of camber. Brakes are mounted on the frame 3 behind the drive wheels 17, 19.

Figure 3:
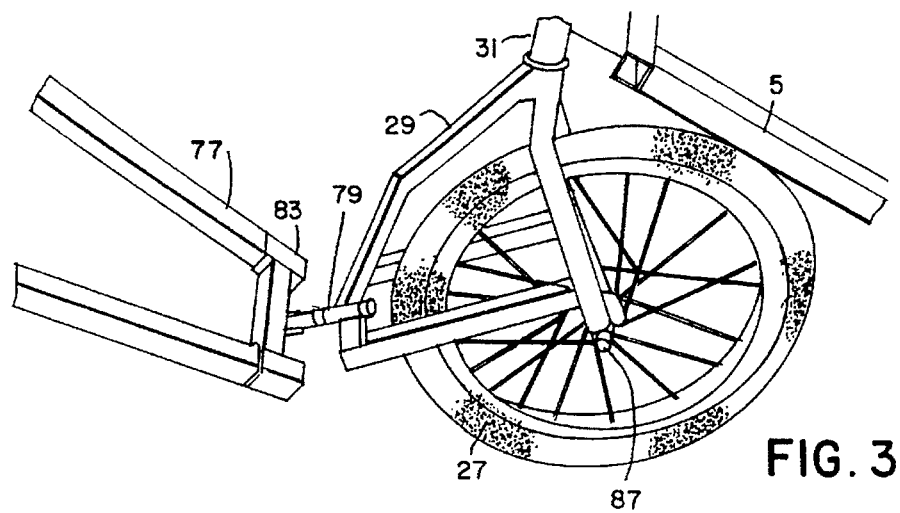
FIG. 3 shows the front end of the present invention having a front wheel fork mount, a front wheel fork, a front wheel, and a steering bar connected to the front fork by a universal joint.

The present invention has at least one front wheel 27 connected to the front 9 of the frame 3. FIGS. 1–3 show one embodiment of the present invention having one front wheel 27 connected to a fork 29 that is mounted on a front fork mount 31. The front wheel fork mount 31 is connected to the front 9 of the frame 3. In one embodiment, the front wheel 27 is mounted on a rotating fork 29 that is connected to the front wheel fork mount 31.

Figure 4:
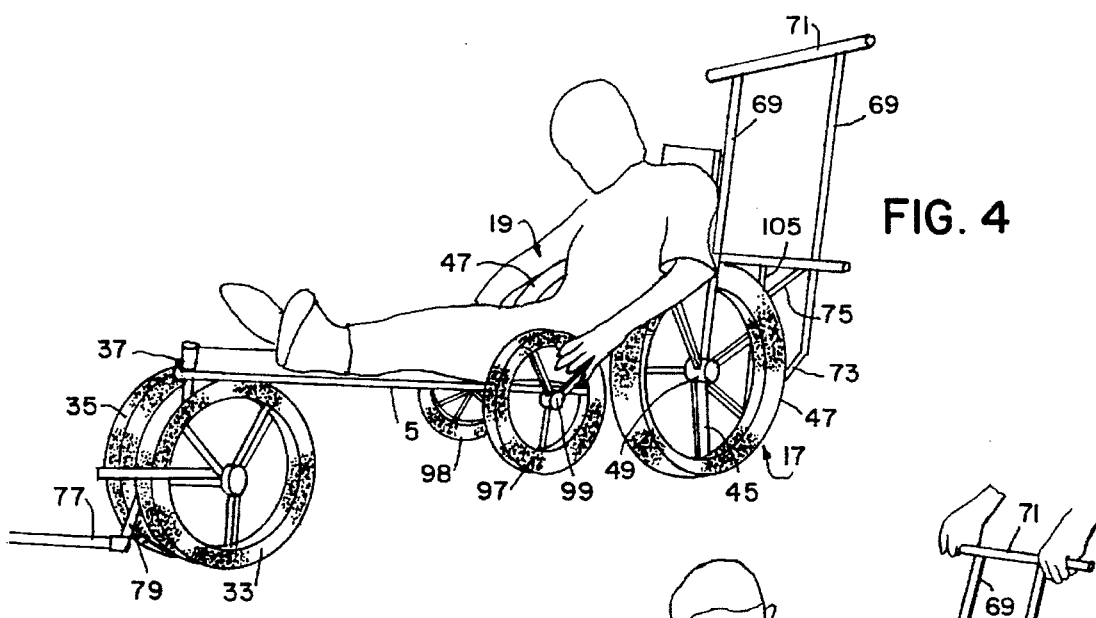
FIG. 4 shows an embodiment of the present invention having a frame, a push structure, two drive wheels, two pre-wheels and two front wheels.
Figure 5:
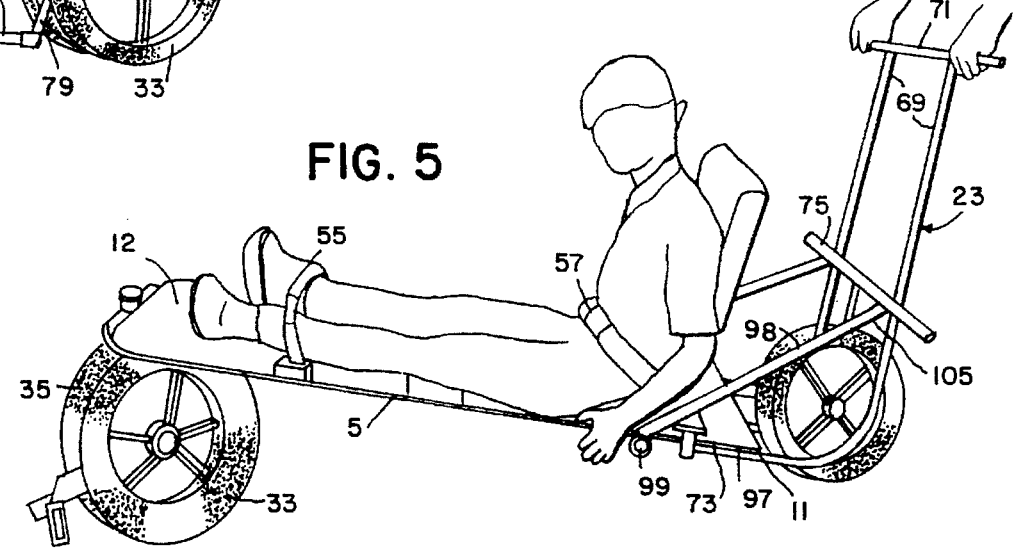
FIG. 5 shows the embodiment of FIG. 4 having the drive wheel removed and the pre-wheels mounted on the auxiliary mount.
Figure 7:
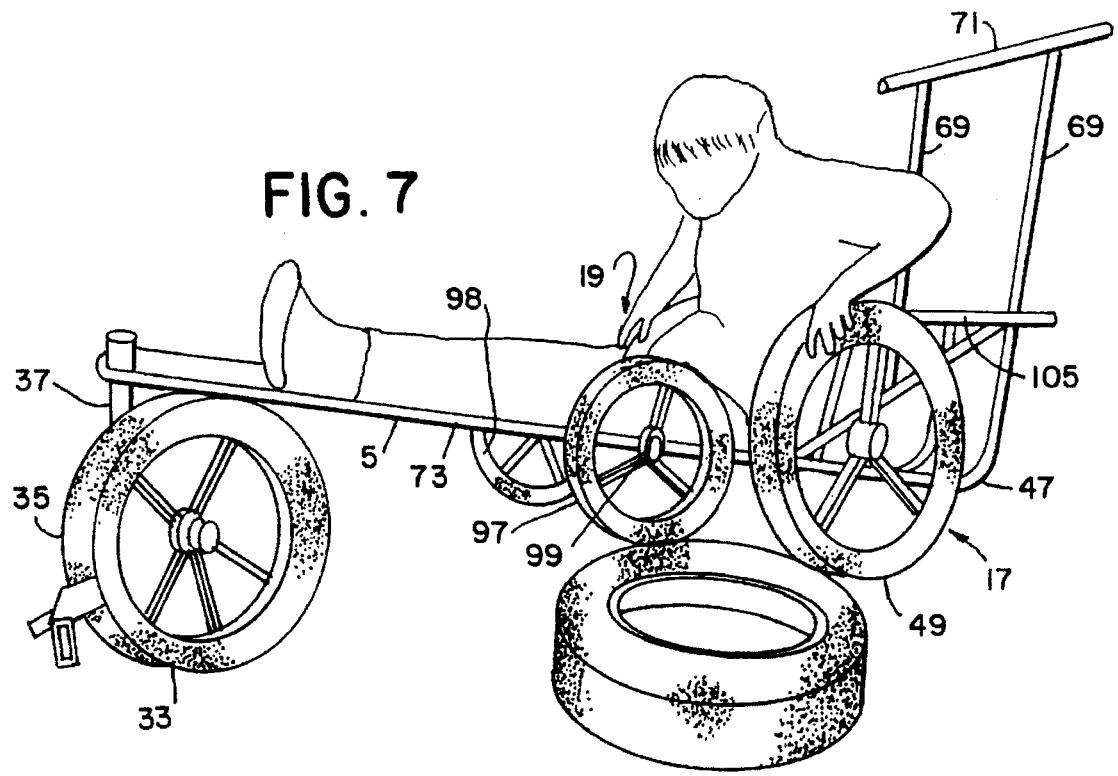
FIG. 7 shows the use of the pre-wheels in overcoming an obstruction.
Figure 12:
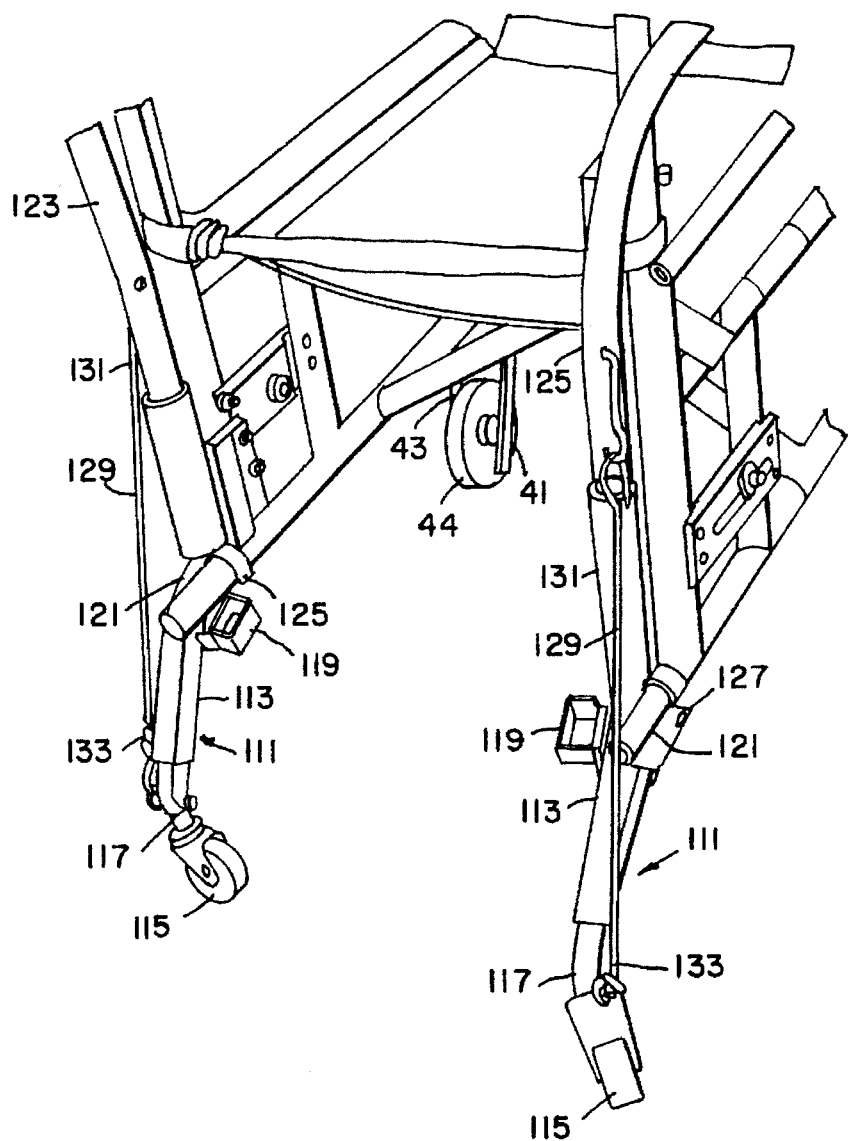
FIG. 12 shows extensions connected to a rear of a wheelchair.

The present invention can have more than one front wheel. As shown in FIGS. 4, 5 and 7, a first front wheel 33 and a second front wheel 35 are connected to a front wheel fork 37. FIG. 12 shows a second embodiment, wherein the fork mount has first and second front fork mounts 41, 43 and wherein the fork and the front wheel are caster wheels 44.

As shown in FIGS. 2, 4 and 7, preferred embodiments of the present invention include drive wheels 17, 19 having high-impact plastic rims 45 with deep-tread mountain bike tires 47 mounted on the rims 45. Preferred embodiments also have handrims 49 mounted on the drive wheels 17, 19 for self-propelling the apparatus. For rugged uses like cross-country travel standard innertubes in the tires are replaced with flat-proof tubeless inserts for preventing flats.

Figure 8:
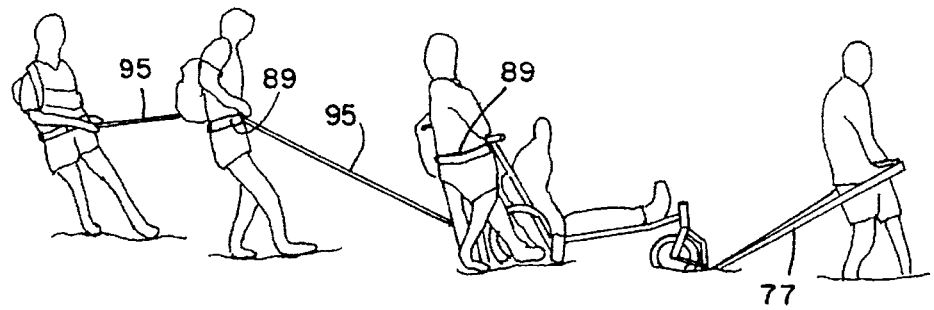
FIG. 8 shows an embodiment of the present invention having a steering bar connected to the front of the frame and multiple assistants harnessed to the rear of the frame for descending a trail.
Figure 9:
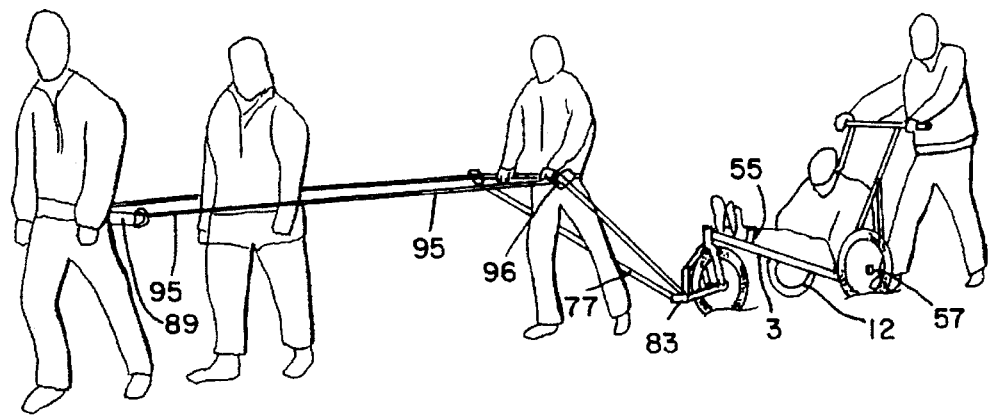
FIG. 9 shows an embodiment of the present invention having a steering bar connected to the front of the frame and multiple assistants harnessed to the steering bar.

In preferred embodiments of the present invention, the frame is designed for carrying a single passenger. As shown in FIGS. 4–10, the driver sits upright on the frame 3 with legs extending forward. A back support 21 extends upward from the frame 3, thereby allowing the passenger to sit comfortably on the frame 3. In preferred embodiments, as shown in FIG. 1, seating 51 is positioned on the platform 12 and frame 3 for user comfort. In one embodiment, the seating 51 is a thick nylon fabric connected to the frame 3 by an aluminum strap. Seating 53 can also be positioned on the back support 21. Ankle pads 55, as shown in FIG. 9, are positioned on the platform 12 of the frame 3 to provide support for the ankles of the user. As shown in FIG. 9, safety belts 57 are used to secure the user in the apparatus. In one embodiment, the safety belts 57 have quick release buckles and secure the waist, chest and ankles of the user to the frame.

Figure 10:
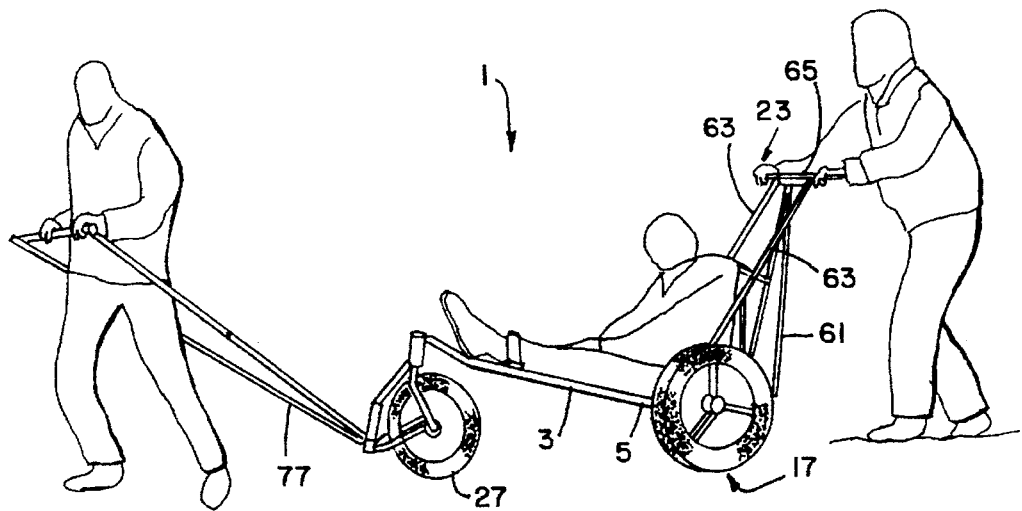
FIG. 10 shows an embodiment of the present invention having a steering bar connected to the front fork, one front wheel, two drive wheels and a push structure.

FIGS. 1–2 and 10 show one embodiment of the push structure 23 of the present invention. The structure 23 has vertical members 61 and sloping seat support members 63 extending upward from near the rear 11 of the frame 3. A horizontal bar 65 is connected to the tops of the vertical members 61 and the support members 63. Handles 67 extend from the vertical members 61. In preferred embodiments, the handles 67 and push structure 23 are adjustable, and the push structure 23 is elevated to about chest height for enabling an assistant to push and laterally stabilize the apparatus. FIGS. 4–7 show a second embodiment of the present invention having two vertical members 69 and a horizontal bar 71 connected to the tops of the vertical members 69.

FIGS. 4–7 show a preferred design of the present invention. The frame 3 and push structure 23 comprise continuous tubular members 73 bent upward at the rear 11 and interconnected by welded tubular cross members 75.

The dimensions of the present invention are dependent on the particular user and the intended use of the apparatus. One embodiment of the apparatus has a frame that is four feet long and one and a half feet wide, with the rear of the frame clearing the ground by ten inches and the front of the frame clearing the ground by twenty-two inches.

Preferred embodiments of the present invention have a frame constructed from chrome-molybdenum.

The present invention is easily equipped with assistance components. As shown in FIGS. 2–4 and 8–9, a steering bar 77 is connectable to the front 9 of the frame 3. In one embodiment, as shown in FIG. 3, the steering bar 77 is coupled to the lower part of the front fork 29 by a universal joint 79. FIG. 4 shows one embodiment of the present invention having a simple single member extending from the front wheel mount as the steering bar 77. FIGS. 2–3 and 8–9 show a preferred embodiment of the present invention having a triangular-shaped steering bar 77. The triangular-shaped steering bar 77 has an apex 83 and a handle 85 opposite the apex 83 for steering and for towing. The apex 83 of the steering bar 77 is coupled to the fork 29 by a universal joint 79 forward of an axle 87 of the front wheel 27.

Figure 11:
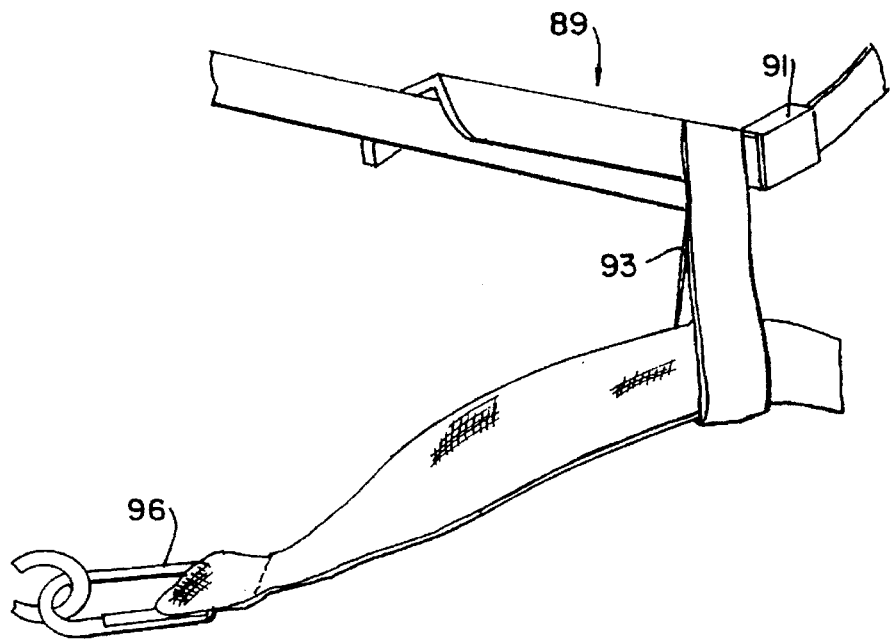
FIG. 11 shows one embodiment of the harness of the present invention.
Figure 13:
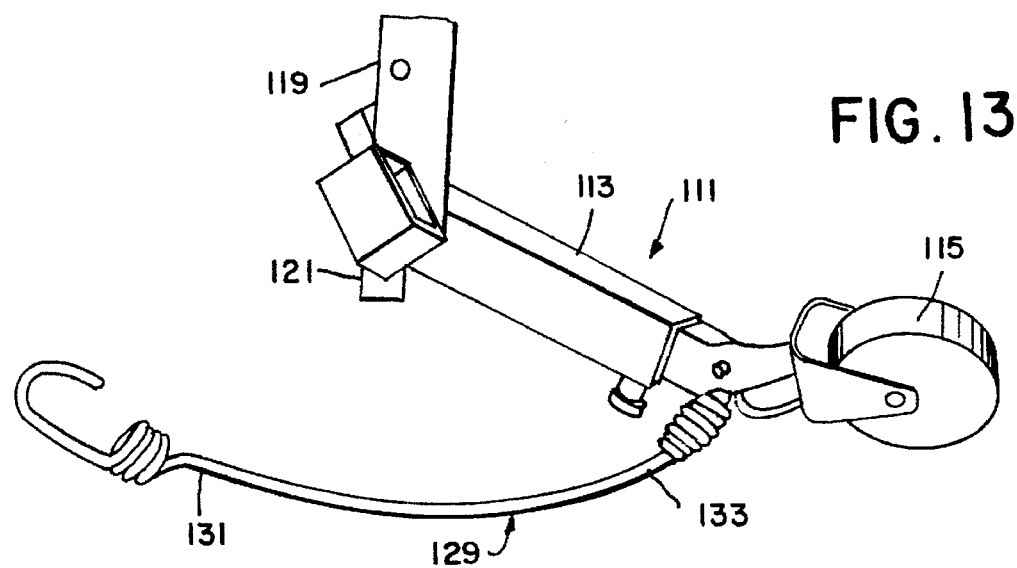
FIG. 13 shows a preferred embodiment of the extension.

The present invention can be further equipped with towing harnesses 89 when additional pulling power is needed. FIGS. 8, 10 and 11 show a preferred embodiment of a harness 89. The harness has wide towing straps 91, preferably of nylon webbing, that rest against the anterior pelvic region of an assistant. The harness 89 also has smaller straps 93 that are attached to the towing straps 91 and are fastened around the waist of the assistant. The towing straps 91 are held in place vertically by the waist straps 93. The harness 89 is connectable to the frame 3 or steering bar 77 by a rope 95, such as mountain climbing rope. The rope 95 is joined to the frame and the harness by connectors 96. Additional harnesses 89 can be attached in a linear series using the rope 95 and connectors 96. When going down steep inclines, a harness 89 is connected to the rear 11 of the frame 3 to provide braking power. FIGS. 8–9 show one embodiment of the present invention having a steering bar 77 and harnesses 89.

As shown in FIGS. 4 and 7, a set of pre-wheels 97, 98 are mounted to the frame 3 to aid the driver in overcoming and rising over obstacles. A first pre-wheel mount 99 is connected to the first side member 5 of the frame 3 ahead of the first drive wheel mount 13. A second pre-wheel mount 101 is connected to the second side member 7 of the frame 3 ahead of the second drive wheel mount 15. First and second pre-wheels 97, 98 are connected to the pre-wheel mounts 99, 101. In preferred embodiments of the present invention, the pre-wheels 97, 98 are removably connected to the pre-wheel mounts 99, 101. The pre-wheels 97, 98 are positioned closer to the drive wheels 17, 19 than to the front wheel 27. Preferred embodiments of the present invention have pre-wheels 97, 98 with smaller diameters than the drive wheels 17, 19. In one embodiment, the pre-wheels 97, 98 are mounted four inches off the ground, as shown in FIGS. 4 and 7.

Preferred embodiments of the present invention use quick-release axles to mount the pre-wheels and the rear wheels to the frame. Using those axles permit rapid and easy removal and reinstillation of the wheels.

Figure 6:
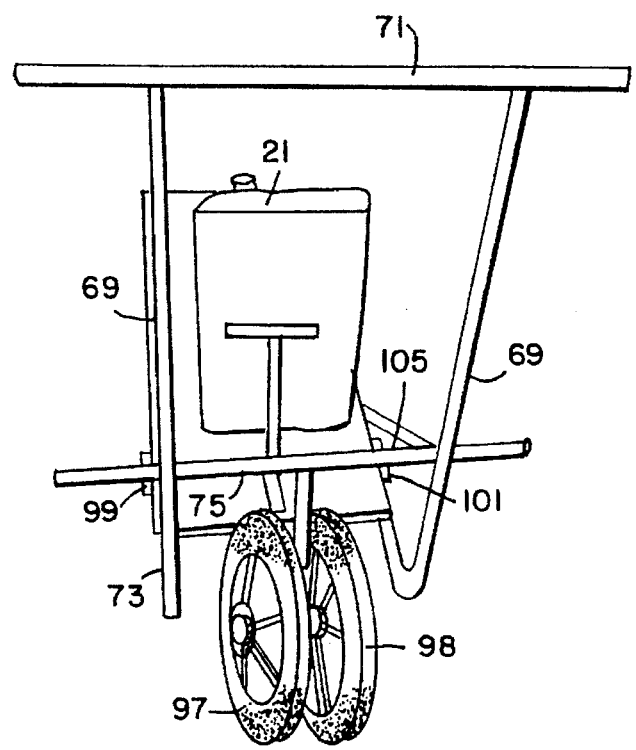
FIG. 6 is a rear view of the embodiment shown in FIG. 5.

As shown in FIGS. 5 and 6, preferred embodiments have an auxiliary mount 105 connected to the rear 11 of the frame 3. One embodiment has the mount 105 in the center-rear of the apparatus. The first and second pre-wheels 97, 98 are removably connectable to the auxiliary mount 105. The auxiliary mount 105 is designed to carry the pre-wheels 97, 98 of the present invention during passages through narrow ways. Preferred embodiments connect the drive wheels 17, 19 and pre-wheels 97, 98 to the frame 3 using quick release axles. During normal operation, the pre-wheels 97, 98 are carried on the left and right sides of the frame 3. When narrow passages are encountered, the pre-wheels 97 are easily removed from the frame 3 and positioned on the mount 105 connected to the rear 11 of the frame 3. The drive wheels 17, 19 are removed, and the pre-wheels 97, 98 are relocated and function as the main support wheels of the apparatus. Travel through narrow passages is possible with the present invention. The overall width of the apparatus decreases and the footprint is narrowed, thus permitting passage through narrow trails.

FIGS. 12–18 show extensions 111 for transport apparatus for disabled individuals. The rearward and downward extensions 111 enable wheeled apparatus to travel through narrow passages and doorways. The extensions 111 have a rotating arms 113 hinged at the rear of the frame. Rear wheels 115 are positioned on the remote ends 117 of the rotating arms 113 of the extensions 111. The extensions 111 can be used with any transport apparatus, including standard wheelchairs and the transport system described above.

As shown in FIGS. 12–18, the extensions 111 have receivers 119 between the hinges 121 and the remote ends 117. Arm rests or levers 123 are connectable to the receivers 119. Stops 125, 127 are mounted between the frame 3 and the extensions 111 for limiting upward movement of the extensions 111.

Figure 14:
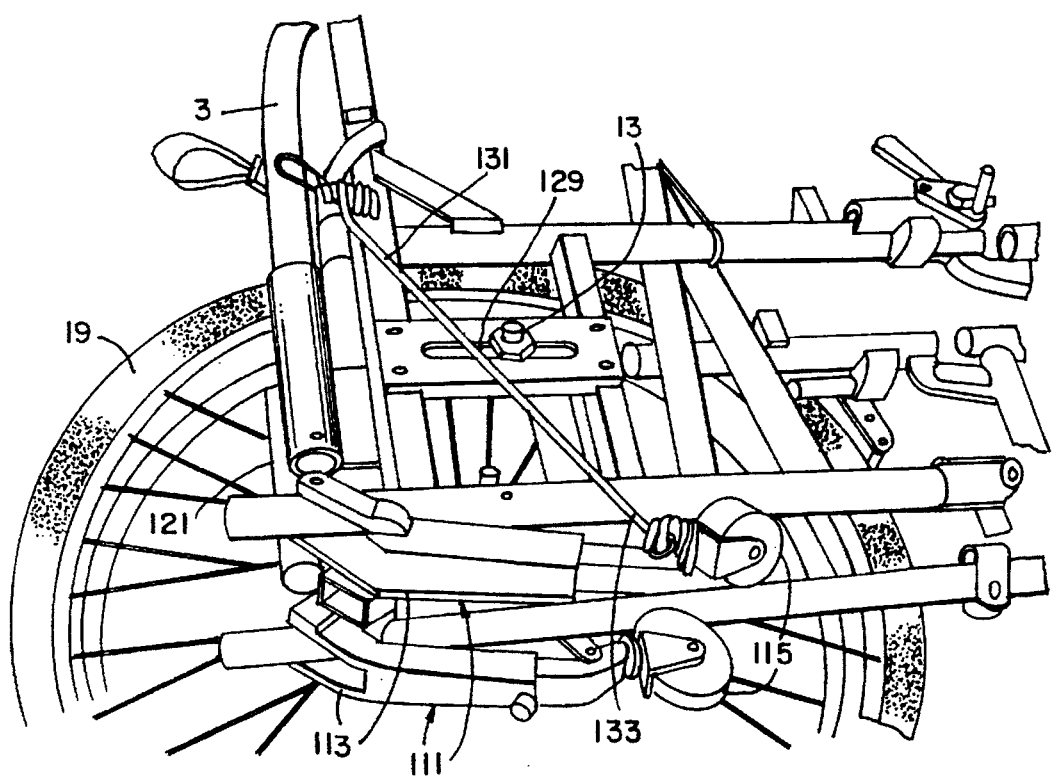
FIG. 14 shows an extension connected to the frame of a wheelchair and held in a lifted, inactive position by an elastic cord.

FIG. 14 shows the positioning of extensions 111 in inactive positions. Elastic members 129 having upper ends 131 and lower ends 133 extend between the extensions 111 and the frame 3 and hold the extensions 111 close to the frame 3 in a retracted position. The lower ends 133 of the members 129 are connected to the rotating arms 113 and the upper ends 131 are connected to the frame 3. Preferred embodiments use elastic cords, having hooks at the ends of the cords for attachment. When the drive wheels 17, 19 are removed and the extensions 111 are positioned in the active positions, the rear wheels 115 of the extensions 111 function as the rear wheels of the apparatus.

Figure 15:
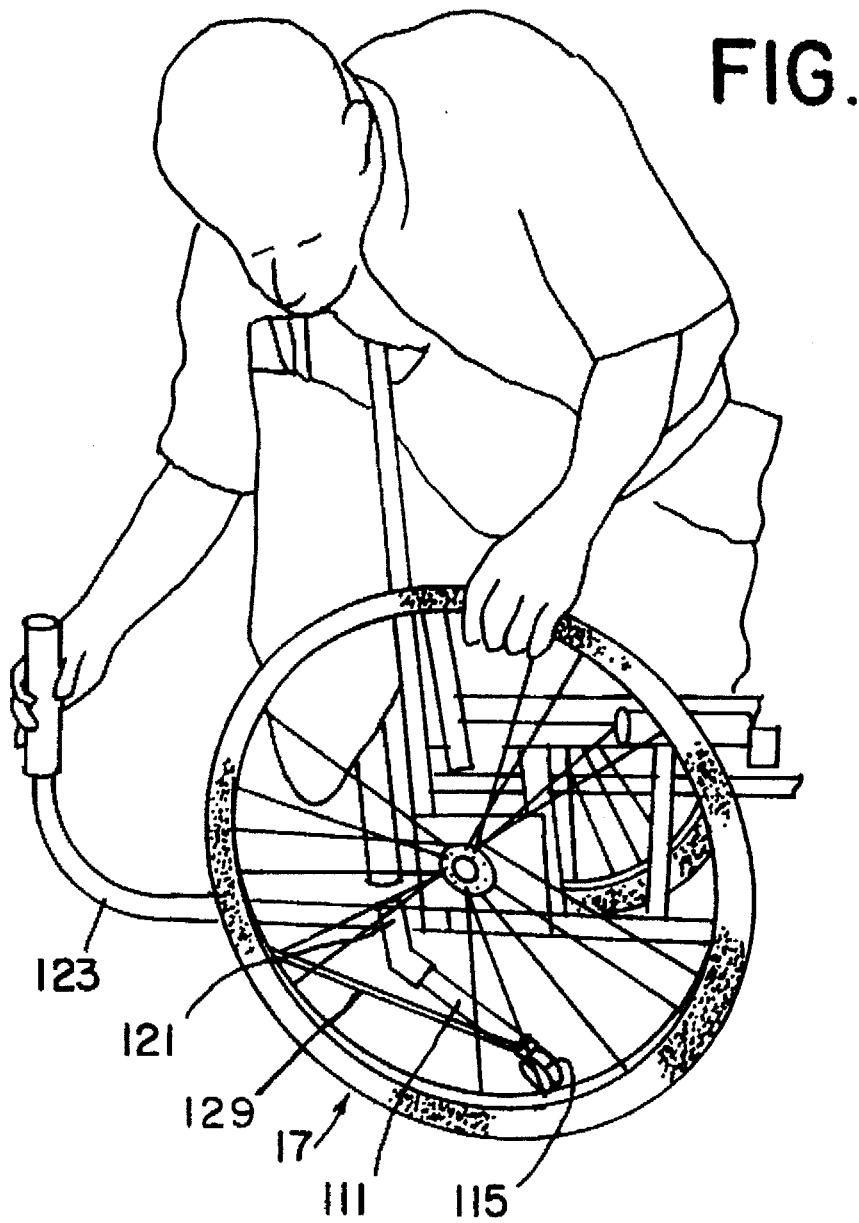
FIG. 15 shows a driver using a lever to rotate an extension into an active position.
Figure 16:
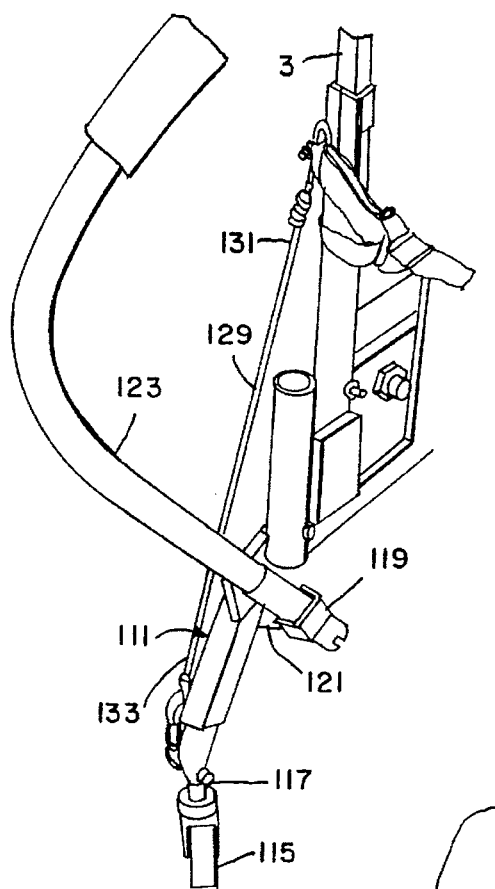
FIG. 16 shows a lever positioned in a receiver of an extension for rotating the extension into an active position.
Figure 17:
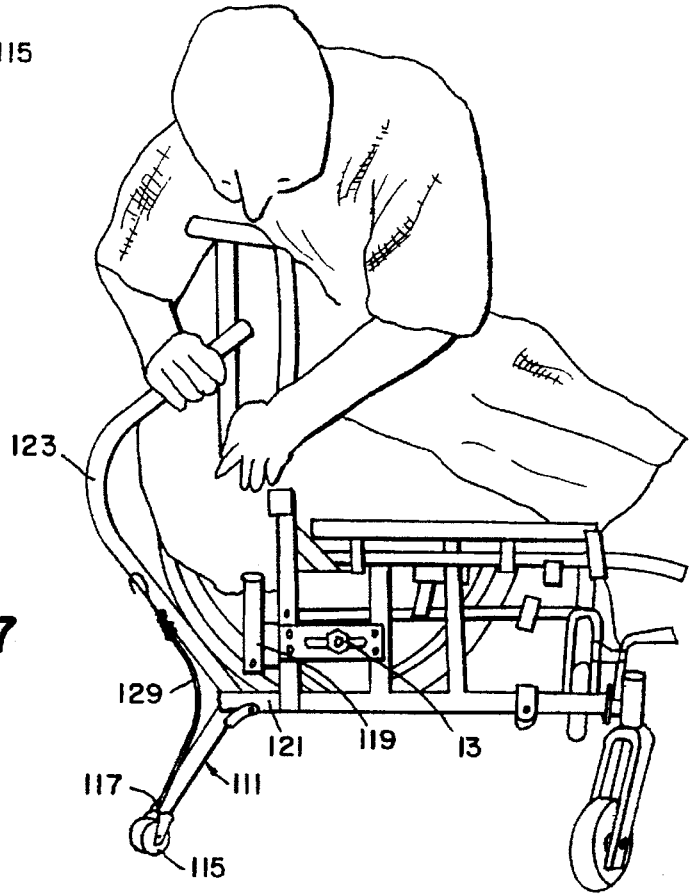
FIG. 17 shows the extension in an active position, with the drive wheel removed from the wheelchair.
Figure 18:
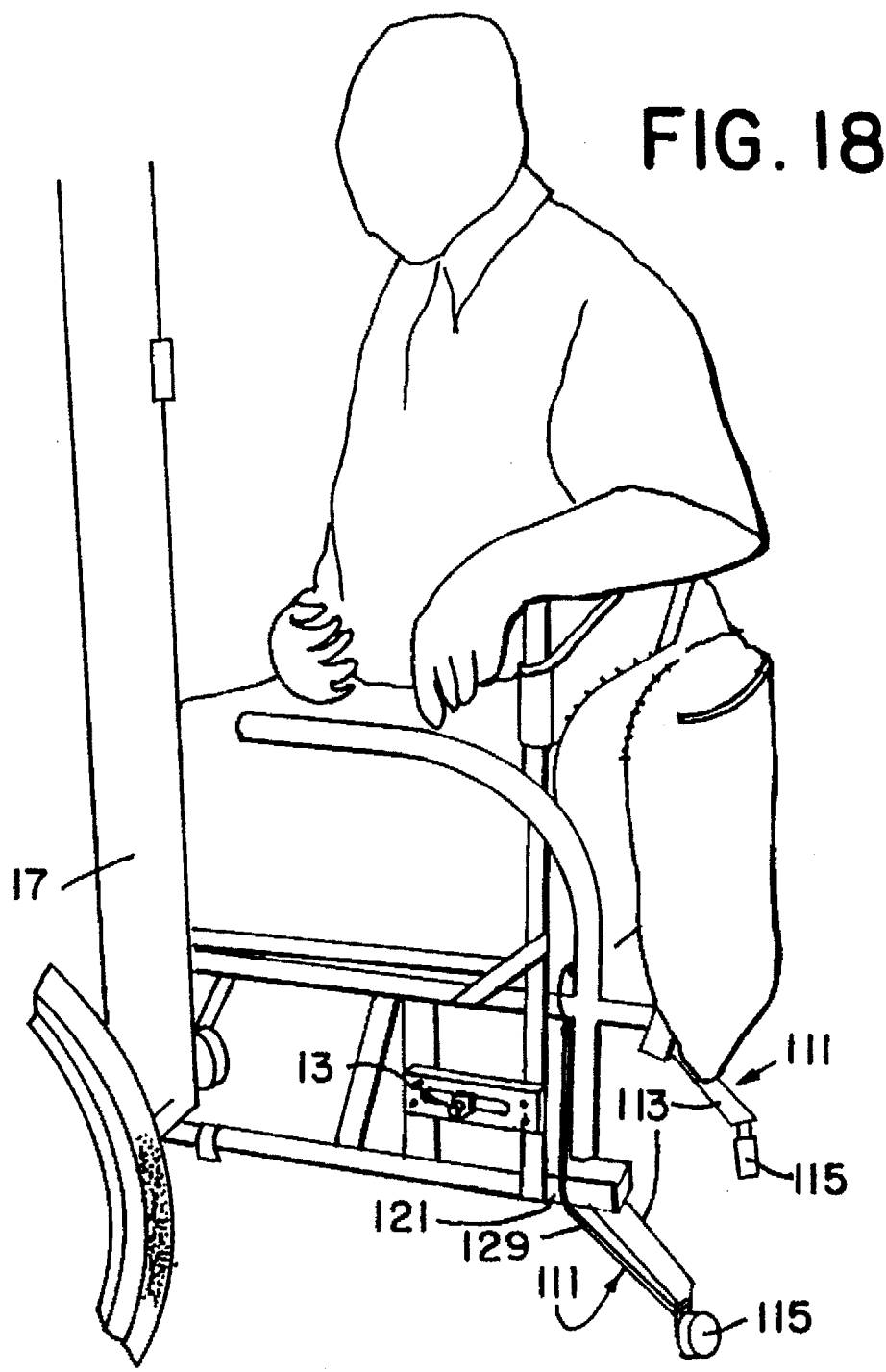
FIG. 18 shows a wheelchair using the wheels on the extensions for support and movement.
Figure 19:
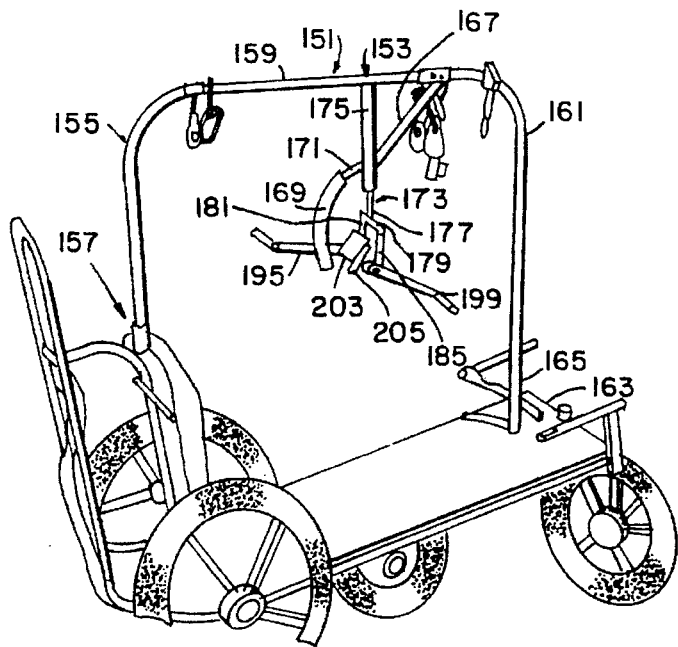
FIG. 19 shows the specialized self-tailing hand winch accessory installed on an embodiment of the present invention.
Figure 20:
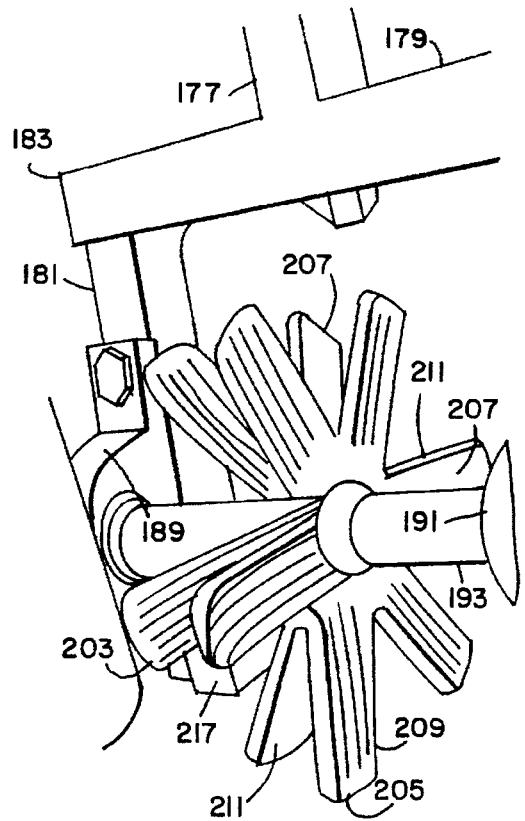
FIG. 20 shows the mounts, shaft and sheaves of the winch accessory.
Figure 21:
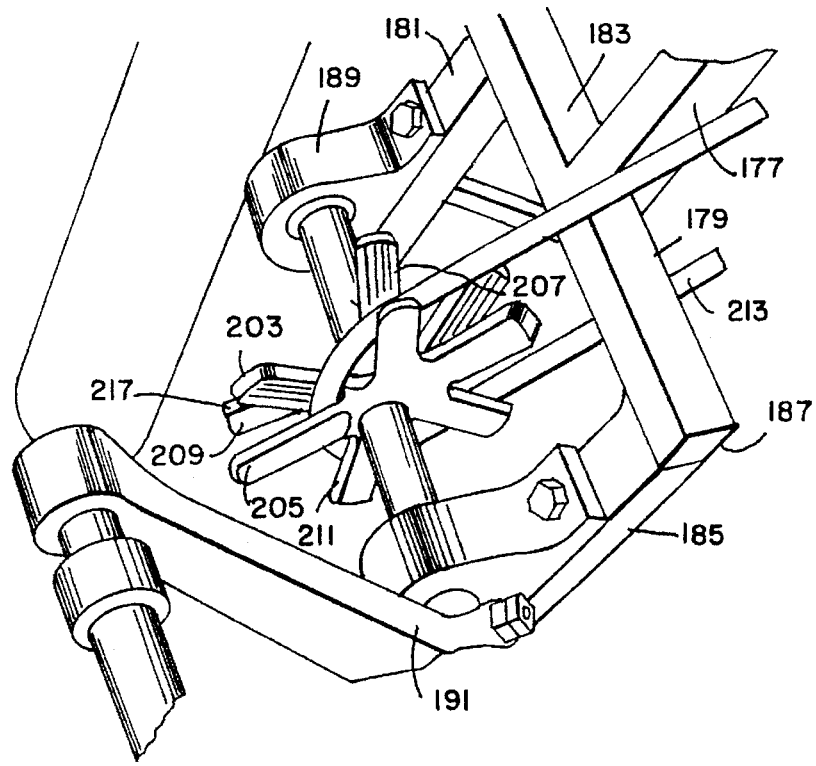
FIG. 21 shows a rope wrapped ¾ turn around the winch accessory of the present invention.
Figure 22:
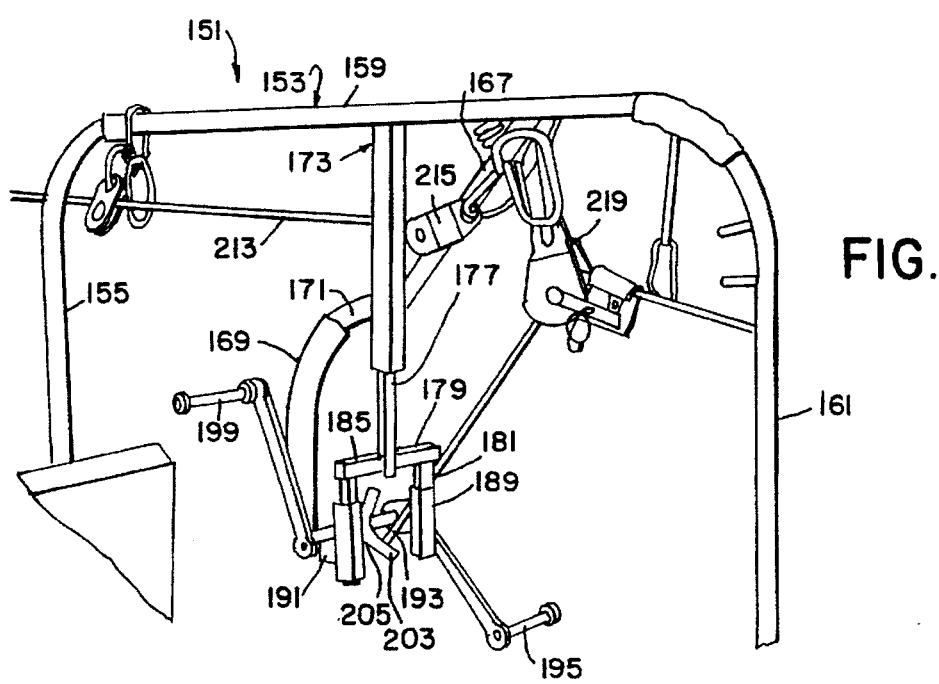
FIG. 22 shows an embodiment of the winch accessory having a U-shaped member, a padded face guard, a pedal housing, pedals, sheaves, and brackets for guiding the rope.

FIGS. 12–18 show a standard wheelchair equipped with the extensions 111. The extensions 111 are held in lifted, inactive positions close to the frame 3 of the chair by elastic cords 129. To reduce the width of the wheelchair, a removable arm rest 123, serving as a lever, is lifted out of a socket. The extensions 111 are released from the retracted positions. The arm rest 123 is inserted in receivers 119 positioned near the top ends of the extensions 111. As shown in FIGS. 15 and 16, the arm rest 123 becomes a lever and is used to rotate the extensions 111 rearward until the extensions 111 come to a stop. As shown in FIGS. 12, 17 and 18, in that position, the rotating arms 113 point a few degrees rearward from vertical. Once the extensions 111 are rotated, the arm rest 123, or lever, is removed and reinstalled.

When the extensions 111 are rotated, the wheelchair is raised off the ground. That allows the drive wheels 17, 19 of the chair to be removed from the apparatus. The rear wheels 115 on the rotating arms 113 serve as the rear support wheels of the apparatus. The driver pulls himself through a narrow passageway using the wheels 115 on the bottoms of the arms 113. Once passage through the narrow way is completed, the drive wheels 17, 19 are reinstalled and the arm rests 123 or levers are used to return the extensions 111 to rearward, inactive positions.

FIGS. 19–23 show another accessory compatible with the present invention. The accessory 151 is a specialized self-tailing hand winch. The accessory 151 includes a U-shaped member 153 having a first segment 155 that is attached to, and extends upward from, the rear 157 of the off-road chair, a second segment 159 connected to the first segment 155 and extending forward above the chair for substantially the entire length of the frame, and a third segment 161 connected to the second segment 159 and extending downward near the front of the frame. A bottom piece 163 is connected to a lower end 165 the third segment 161. A bar 167 is connected to and extends downward from the second segment 159. In one embodiment, the bar 167 is connected to the second segment 159 near the front of the second segment 159 and extends downward and rearward to a position in front of a driver's face. The bar 167 has a padded face guard 169 connected to a lower end 171 of the bar 167. A pedal housing 173 extends downward from near the center of the second segment 159. In one embodiment of the present invention, the housing 173 extends from a first piece 175 molded to the second segment 159 and extending downward at an angle perpendicular to the second segment 159. The housing 173 has a first portion 177 that is connected to the molded first piece 175. A second portion 179 is perpendicularly attached to a lower end of the first piece 175. A third portion 181 extends downward from a left end 183 of the second portion 179. A fourth portion 185 extends downward from a right end 187 of the second portion 179. Mounting brackets 189, 191 are connected to the third portion 181 and to the fourth portion 185. A pedal shaft 193 extends between and through the mounting brackets 189, 191. A first pedal 195 is connected to the left end 197 of the shaft 193. A second pedal 199 is connected to the right end 201 of the shaft 193. Preferably, the pedals 195, 199 are positioned 180 degrees to each other. Two sheaves 203, 205 are mounted around the center of the shaft 193. Each sheave has an interior face 207 and an exterior face 209. The interior face 207 of each sheave angles away from the interior face 207 of the other sheave like a conventional V-pulley. In preferred embodiments, the interior faces 207 angle away from each other at an internal angle of about 20 degrees. Each sheave 203, 205 has crescent-shaped ridges 211 for grasping a rope 213. The ridges 211 point both forward and backward, alternating direction periodically. That configuration provides for gripping power on the rope 213 in both directions. In preferred embodiments, the ridges 211 extend about ⅛ inch above the surface of the sheave.

The accessory 151 moves along a fixed mountain climbing rope 213 and provides the driver with pulling power for ascending slopes and with braking power for descending slopes. The rope 213 extends from the rear of the chair and engages a bracket 215 positioned on the second segment 159 ahead of the pedal housing 173. The bracket 215 directs the rope 213 downward and rearward. The rope 213 is fed into the groove 217 between the sheaves 203, 205 and is wrapped at about a ¾ turn through the sheaves 203, 205. The ridges 211 on the sheaves 203, 205 grasp the rope 213. The rope 213 continues upward through a second bracket 219 that extends from the second segment 159 near the front. The second bracket 219 directs the rope 213 downward towards the front end of the present invention and under a bottom piece 163 of the third segment 161.

In preferred embodiments, the accessory 151 is readily added to and removed from the present invention.

Figure 23:
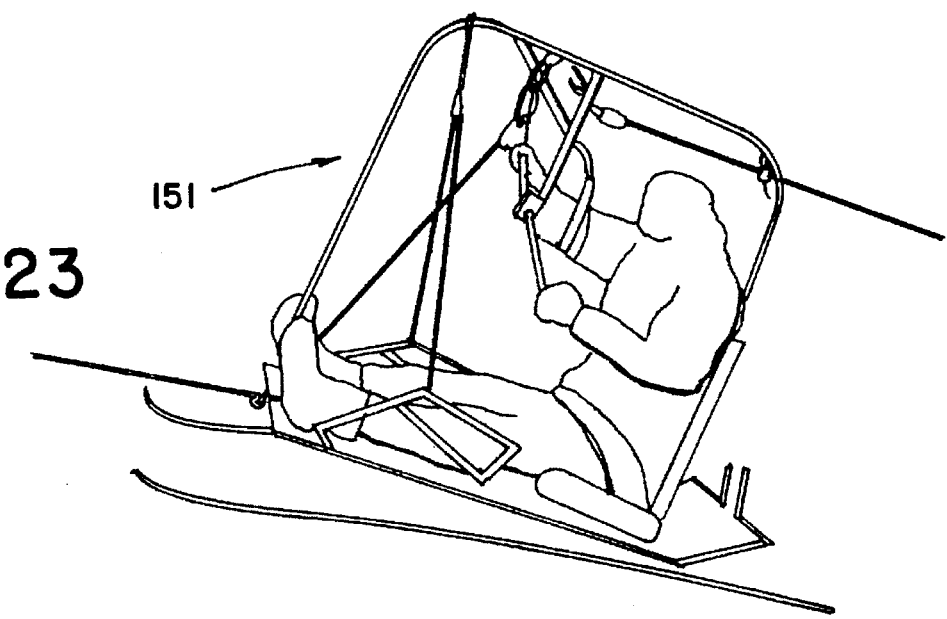
FIG. 23 shows the operation of a winch accessory mounted on a sled.

FIG. 23 shows the winch accessory connected to a sled. The principles involved are identical for use of the winch accessory with a sled as with an embodiment of the present invention.

While the invention has been described with reference to specific embodiments, modifications and variations of the invention may be constructed without departing from the scope of the invention, which is defined in the following claims.

I claim:

1. A transport apparatus for disabled individuals comprising a frame for carrying a user, the frame having a first side member, a second side member, a front and a rear, a first drive wheel mount connected to the first side member of the frame near the rear, a second drive wheel mount connected to the second side member of the frame near the rear, a front wheel fork mount connected to the front of the frame, a fork connected to the fork mount, a front wheel on a front axle connected to the fork and turning with the fork relative to the frame, an universal joint provided forward of the front wheel below the front axle of the frame for connecting the fork mount and a steering device, a back support connected to the rear of the frame, a push structure extending upward from the rear of the frame behind the back support, first and second drive wheels removably connected to the first and second wheel mounts, and tires having treads suitable for rugged travel secured around the wheels.

2. The apparatus of claim 1, further comprising a steering bar connectable to the fork, wherein the steering bar has a triangular shape with an apex and a handle opposite the apex for steering and for towing, and wherein the apex of the steering bar is coupled to the fork by the universal joint forward of the axle of the front wheel.

3. The apparatus of claim 1, further comprising a rope, and a harness connectable to the frame, the harness having towing straps and waist straps connected to the towing straps and having a frame connector for alternately connecting to the rear of the frame and to the fork in front of an axle of the front wheel.

4. The apparatus of claim 1, further comprising a platform connected to the frame, ankle pads positioned on the platform near the front for supporting ankles of a user and a seat on the platform near the back support.

5. The apparatus of claim 1, wherein the push structure has vertical members extending upward from near the rear of the frame and horizontal handles extending from the vertical members.

6. The apparatus of claim 5, further comprising sloping seat support members extending upward from the frame and a horizontal bar connected to tops of the support members.

7. The apparatus of claim 1, wherein the frame and push structure comprise continuous tubular members bent upward at the rear and interconnected by welded tubular cross members.

8. The apparatus of claim 1, further comprising a first pre-wheel mount connected to the first side member of the frame ahead of the first drive wheel mount and a second pre-wheel mount connected to the second side member of the frame ahead of the second drive wheel mount, and first and second pre-wheels having smaller diameters than the drive wheels and being removably connectable the pre-wheel mounts for lifting the frame over obstacles.

9. The apparatus of claim 8, wherein the pre-wheels and the drive wheels are mounted to the frame by quick-release axles, and further comprising an auxiliary mount connected to the rear of the frame, the first and second pre-wheels being removably connectable to the auxiliary mount.

10. The apparatus of claim 9, further comprising rearward and downward extensions hinged at the rear of the frame, rear wheels on remote ends of the extensions, receivers on the extensions between the hinges and the remote ends, levers connectable to the receivers, and plural stops mounted between the frame and the extensions for limiting upward movement of the extensions, whereby moving the extensions to forward positions lifts and supports the frame on the rear wheels and the front wheel and enables removal of the drive wheels.

11. A transport apparatus for disabled individuals comprising a frame for carrying a user, the frame having a first side, a second side, a front and a rear, a first drive wheel mount on the first side of the frame near the rear, a second drive wheel mount on the second side of the frame near the rear, at least one front wheel fork mount connected to the frame near the front of the frame, a fork connected to the fork mount, a front wheel connected to the fork, an universal joint connected to the fork forward of the front wheel below a front axle of the frame for connecting the fork mount and a steering device, drive wheels connected to the drive wheel mounts, a first extension connected to the first side of the frame near the rear, a second extension connected to the second side of the frame near the rear, the extensions comprising rotating arms with first ends and second ends, small rear wheels mounted on the first ends, and hinges connecting the second ends to the frame, receivers on the rotating arms for receiving levers for rotating the arms between rearward and active forward positions, wherein in the forward positions the rear wheels touch ground and support the frame, with the drive wheels lifted from the ground.

12. The apparatus of claim 11, further comprising elastic members having upper ends and lower ends, the lower ends connected to the rotating arms and the upper ends connected to the frame for lifting the rear wheels when the arms are in rearward positions.

13. The apparatus of claim 11, further comprising a first pre-wheel mount connected to the first side of the frame ahead of the first drive wheel mount and a second pre-wheel mount connected to the second side of the frame ahead of the second drive wheel mount, and first and second pre-wheels having smaller diameters than the drive wheels and being connectable to the pre-wheel mounts for lifting the frame over obstacles.

14. The apparatus of claim 13, wherein the pre-wheels and the drive wheels are mounted to the frame by quick-release axles, and further comprising an auxiliary mount connected to the rear of the frame, the first and second pre-wheels being removably connectable to the auxiliary mount.

15. The apparatus of claim 11, further comprising a steering bar connectable to the fork, wherein the steering bar has a triangular shape with an apex and a handle opposite the apex for steering and for towing, and wherein the apex of the steering bar is coupled to the fork by a universal joint forward of an axle of the front wheel.

16. The apparatus of claim 11, further comprising a rope, and a harness connectable to the frame, the harness having towing straps and waist straps connected to the towing straps and having a frame connector for alternately connecting to the rear of the frame and to the fork in front of an axle of the front wheel.

17. The apparatus of claim 11, wherein the fork mount comprises first and second front fork mounts and wherein the fork and the front wheel comprise caster wheels.

18. An off-road transport apparatus for disabled individuals comprising a frame for supporting a driver, the frame having a first side, a second side, a front and a rear, a first drive wheel mount on the first side of the frame near the rear, a second drive wheel mount on to the second side of the frame near the rear, a first drive wheel mounted on the first drive wheel mount, a second drive wheel mounted on the second drive wheel mount, a first front fork mount connected to the front side of the frame, a fork connected to the fork mount, a front wheel connected to the fork, an universal joint connected to the fork forward of the front wheel below a front axle of the frame for connecting the fork mount and a steering device, a first pre-wheel mount on the first side of the frame ahead of the first drive wheel mount, a second pre-wheel mount on the second side of the frame ahead of the second drive wheel mount, pre-wheels mounted on the pre-wheel mounts, and a back support connected to the frame and extending upward from the rear of the frame.

19. The apparatus of claim 18, further comprising a triangular steering bar having an apex, a handle opposite the apex, the apex being coupled to the front side of the frame by a universal joint, and a push structure extending upward from the rear of the frame and positioned behind the back support.

20. The apparatus of claim 18, further comprising a first extension hinged to the first side of the frame near the rear, a second extension hinged to the second side of the frame near the rear, the extensions having rotating arms with first ends and second ends, small rear wheels mounted to the first ends, and the second ends rotatably hinged to the frame for movement between inactive rearward positions and active supporting forward positions for lifting drive wheels for their removal from the drive wheel mounts.

21. The apparatus of claim 1, further comprising a U-shaped member having a first segment attached to and extending upward from the rear of the frame, a second segment connected to the first segment and extending above the frame for essentially an entire length of the frame, and a third segment connected to the second segment and extending downward towards the frame and being connected at the front of the frame, a bar having an upper end and a bottom end, the upper end connected to and extending downward from the second segment, a padded face guard connected to the bottom end of the bar, a pedal housing extending downward from the second segment near a center of the second segment, the housing further comprising a first piece molded to the second member, a first portion connected to the first piece, a second portion having a left end and a right end and perpendicularly connected to a lower end of the first portion, a third portion connected to and extending downward from the left end of the second portion, a fourth portion connected to and extending downward from the right end of the second portion, a first shaft mounting bracket connected to the third portion, a second shaft mounting bracket connected to the fourth portion, a pedal shaft extending between and through the shaft mounting brackets with a first end of the shaft extending through the first mounting bracket and a second end of the shaft extending through the second mounting bracket, a first pedal connected to the first end of the shaft, a second pedal connected to the second end of the shaft, the first pedal connected to the shaft at a position 180 degrees to a position of the second pedal, a first sheave mounted around the shaft, a second sheave mounted around the shaft such that a groove is formed between the two sheaves, and wherein each sheave has an interior face and crescent shaped ridges, and guide brackets connected to the second segment for guiding a rope.

\* \* \* \* \*